(12) United States Patent
Journeaux et al.

(10) Patent No.: US 7,676,899 B2
(45) Date of Patent: Mar. 16, 2010

(54) CABLE INSTALLATION

(75) Inventors: Terry Journeaux, Hants (GB); Jonathan Rawlinson, Prescot (GB)

(73) Assignee: Prysmian Cables & Systems Limited, Hants (GB)

( * ) Notice: Subject to any disclaimer, the term of this patent is extended or adjusted under 35 U.S.C. 154(b) by 380 days.

(21) Appl. No.: 10/566,387

(22) PCT Filed: Jul. 30, 2003

(86) PCT No.: PCT/GB03/03360

§ 371 (c)(1), (2), (4) Date: Sep. 13, 2006

(87) PCT Pub. No.: WO2005/015703

PCT Pub. Date: Feb. 17, 2005

(65) Prior Publication Data

US 2007/0137882 A1    Jun. 21, 2007

(51) Int. Cl.
B23P 11/00 (2006.01)
(52) U.S. Cl. .......... 29/525.01; 24/518; 24/520; 248/63; 248/67.7; 248/68.1
(58) Field of Classification Search .......... 24/517–521, 24/530; 248/546, 63, 67.7, 68.1; 29/525.01
See application file for complete search history.

(56) References Cited

U.S. PATENT DOCUMENTS 2,886,815 A * 5/1959 Young .................. 227/120
3,638,892 A * 2/1972 Boye et al. ................ 248/300
3,883,064 A * 5/1975 Hilgers ..................... 227/120
4,450,605 A   5/1984 Schäty
4,537,343 A   8/1985 Johansson
4,655,423 A * 4/1987 Schavilje et al. ............ 248/71
5,113,717 A * 5/1992 Plamper ................... 74/502.6

FOREIGN PATENT DOCUMENTS

DE   23 34 913 A      1/1975
DE   3624993 A1       1/1988
DE   42 16 466 C 1    8/1993

OTHER PUBLICATIONS

Communication pursuant to Article 96(2) EPC issued by the European Patent Office, mailed Nov. 17, 2006, on corresponding European application No. 03 817 972.79—1242.

* cited by examiner

*Primary Examiner*—David P Bryant
*Assistant Examiner*—Christopher M Koehler
(74) *Attorney, Agent, or Firm*—Finnegan, Henderson, Farabow, Garrett & Dunner, L.L.P.

(57) ABSTRACT

A method of installing electrical cabling by securing an electrical cable clip to a structure using a fixing element that passes through the clip into the structure, subsequently inserting one or more electrical cables into a cable receiving channel defined by the clip and securing the electrical cables in that channel. The structure will typically be the wall of a building or the like and the fixing element is preferably a nail that is fired through the base portion of the electrical cable clip by means of a nail gun.

15 Claims, 4 Drawing Sheets

CABLE INSTALLATION

CROSS REFERENCE TO RELATED APPLICATION

This application is a national phase application based on PCT/GB2003/003360, filed Jul. 30, 2003, the content of which is incorporated herein by reference.

BACKGROUND TO THE INVENTION

The invention relates to improvements in cable installation and particularly, but not exclusively, to the installation of fire resistant cables.

United Kingdom regulations and standards for fire resistant cable installations require that the cable is fixed to building structures by metallic fixings that maintain their support during a fire. Currently, such cables are installed using a P-shaped metallic clip, which is fitted around the cable and then screwed to the building structure. Typically, one screw is used and is screwed into a pre-drilled hole, which may have to be plugged to accept the screw. If two cables are to be installed side-by-side, an extended U-shaped clip may be used. Such clips are usually secured by means of two screws, one on each side of the cables. As with the P-shaped clip, the clip is fitted around the cables and is then secured to the building structure by means of the two screws.

The typical spacing between fixings in a fire resistant cable installation is 300 mm. With this spacing, to install 100 m of cable, over 330 fixings are required. It is estimated that it would take approximately 24 hours to install 330 conventional P-shaped fixings. This adds to the cost of installing cabling. A further disadvantage of installing cabling using known clips is that the clip must be fitted around the cable before being secured to the building structure and the installer has to hold the clip in place and provide support for the cable while screwing the screw(s) into its (their) hole(s). This makes installation more awkward and time consuming.

An object of the invention is to at least partially alleviate one or both of these problems and/or at least provide an alternative to existing practice.

SUMMARY OF THE INVENTION

The invention provides, a method of installing electrical cabling, said method comprising securing an electrical cable clip to a structure using a fixing element that passes through said clip into said structure, inserting at least one electrical cable into a cable receiving channel in said clip and securing said at least one electrical cable in said channel.

A method of installing electrical cabling, said method comprising the steps of:

locating an electrical cable clip body relative to a structure such that an electrical cable-receiving channel of said clip has a desired orientation relative to the structure;

firing a nail from a nail gun through an aperture in a base region of said cable receiving channel such that the nail fixes the electrical cable clip to said structure and a head of the nail does not protrude into said channel;

inserting at least one electrical cable through an opening into said cable receiving channel such that the cable lies against said base region; and pressing a closure member over said opening of said cable receiving channel and snap-fitting said closure member into locking engagement with said electrical cable clip body such that said at least one electrical cable is secured in said cable receiving channel.

A method of installing electrical cabling, said method comprising the steps of:

locating an electrical cable clip on a nozzle of a nail gun such that an elongate cable-receiving channel of said clip has a desired orientation relative to a normal upright use position of said nail gun;

placing said electrical cable clip proximate a structure to which it is to be fixed with said nail gun in said upright use position and firing a nail from said nail gun through a base region of said electrical cable clip into said structure;

inserting at least one electrical cable through an opening into said cable receiving channel; and closing said opening to secure said at least one electrical cable in said cable receiving channel by snap-fitting a closure member in a position in which it closes said opening.

The invention also includes an electrical cable fixing kit for use in securing electrical cabling to a structure, and an adapter for a nail gun, said electrical cable clip being arranged to receive and secure at least one electrical cable and being provided with an aperture for a nail by which, in use, said electrical cable clip is secured to said structure, said adapter comprising a body on which said cable clip can be fitted, said body having a through-hole arranged to be in line with said aperture when said clip is fitted to the body, and said through-hole being arranged to receive a nozzle of a nail gun such that said body part can be releasably fixed on said nozzle whereby said electrical cable clip can be placed in a desired position adjacent said structure supported by said nozzle via said adapter to permit a nail to be fired through said nozzle to pass through said aligned through-hole and aperture to secure said electrical cable clip against said structure at said desired position.

The invention also includes a nail gun adapter comprising a through-hole and being adapted for connection to a nozzle of a nail gun such that said through-hole is aligned with a through-bore defined by the nozzle, the adapter being arranged to engage in a cable receiving recess of an electrical cable clip body for locating and holding the clip proximate a structure to which said clip is to be secured by a nail fired from said nail gun.

The invention also includes a nail gun nozzle having a through-bore through which nails can be fired, a first end of said nozzle being adapted for fitting to said nail gun and a second end being adapted to support and locate an electrical cable clip such that said clip can be held by the nozzle proximate a structure to which the clip is to be secured by a nail fired from the nail gun.

The invention also includes an electrical cable clip for securing electrical cabling to a structure, said clip being arranged to receive and secure at least one electrical cable and having a rear side provided with a projection, said projection being provided with an aperture for a fixing element such as a screw or nail and the arrangement being such that, in use, contact between the clip and said structure is via said projection.

The invention also includes an electrical cable clip for securing electrical cabling to a structure, said clip comprising a body portion that defines a channel for receiving at least one electrical cable, a closure member for closing an opening through which, in use, said at least one electrical cable is inserted into said channel and a resilient locking mechanism by which said closure member can be locked into a position in which it closes said opening.

The invention also includes an electrical cable clip for securing electrical cabling to a structure, said clip comprising a body portion that defines a recess for at least one electrical cable clip and a closure member for closing an opening through which, in use, said at least one electrical cable is inserted into said channel, said body portion having at least one through-hole for a fixing element such as a screw or a nail, said at least one through-hole being arranged such that, in use, said screw or nail is inserted into said at least one through-hole via said opening into said channel.

The invention also includes a method of installing electrical cabling comprising fixing said cabling to a structure, such as the wall of a building, by means of a nail fired from a nail gun.

The invention also includes a method of installing electrical cabling by means of an electrical cable clip that is fixed to a structure, such as the wall of a building, by means of a nail fired from a nail gun, the clip being fitted onto the nail gun for installation such that the installer does not have to handle the clip while firing the nail.

The invention also includes a method of installing electrical cabling by means of an electrical cable clip fixed to a structure, such as the wall of a building, by means of a nail fired through the clip into the structure, the nail gun comprising a main body portion having a normal use orientation and the clip being located on the nail gun by a part connected to and movable relative to the main body portion such that the orientation of the clip can be varied so that a cable receiving channel of the clip when installed will point in the direction in which the cabling is to run, although the nail gun is fired with the main body portion in said normal use orientation.

The invention also includes a nail gun having a handle and a part for mounting a fixing for an elongate object on said nail gun, said nail gun having a normal use orientation in which said handle extends in a predetermined direction and said part being movable relative to said handle such that the orientation of said fixing relative to the handle can be set to a desired position, whereby, in use, an installer can vary the orientation of fixings installed using said nail gun with said handle extending said predetermined direction.

BRIEF DESCRIPTION OF THE DRAWINGS

In order that the invention may be well understood, some embodiments thereof, which are given by way of example only, will now be described with reference to the drawings, in which.

DESCRIPTION OF THE SOME PREFERRED EMBODIMENTS

Figure 1:
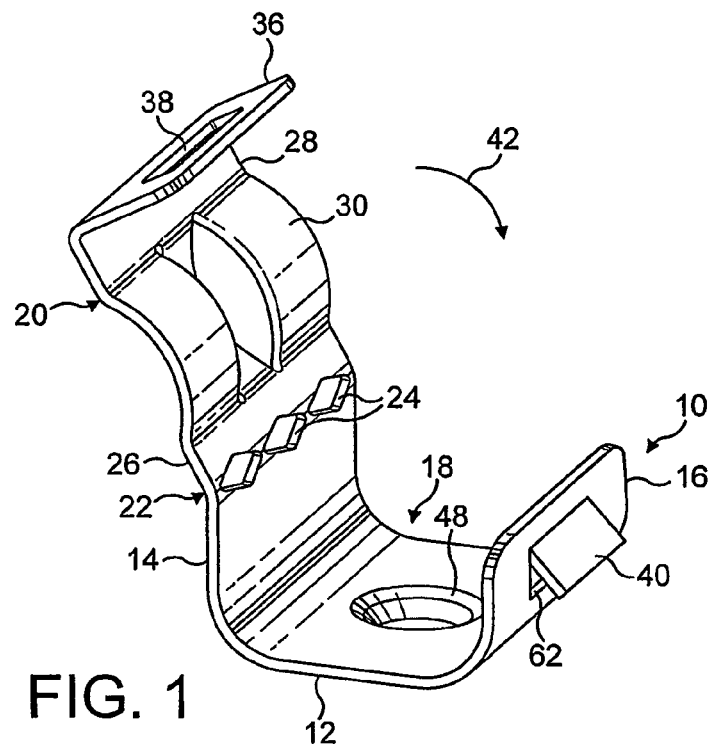
FIG. 1 is a perspective view of an electrical cable clip for securing electrical cabling to a structure.
Figure 2:
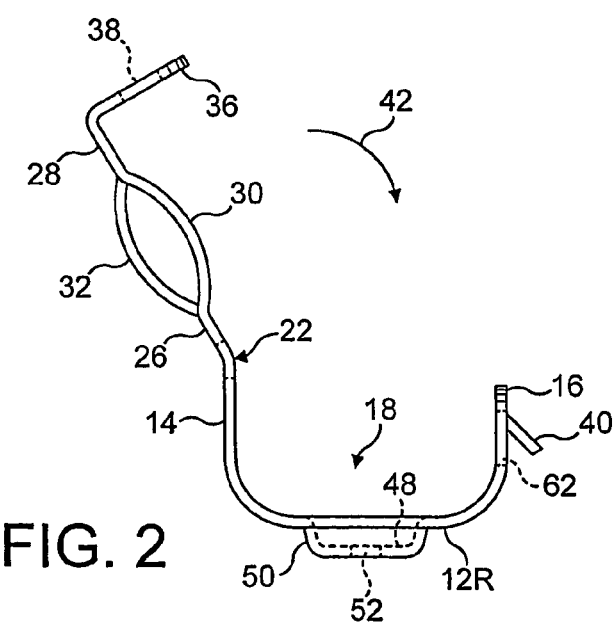
FIG. 2 is an end elevation of the clip shown in FIG. 1.
Figure 7:
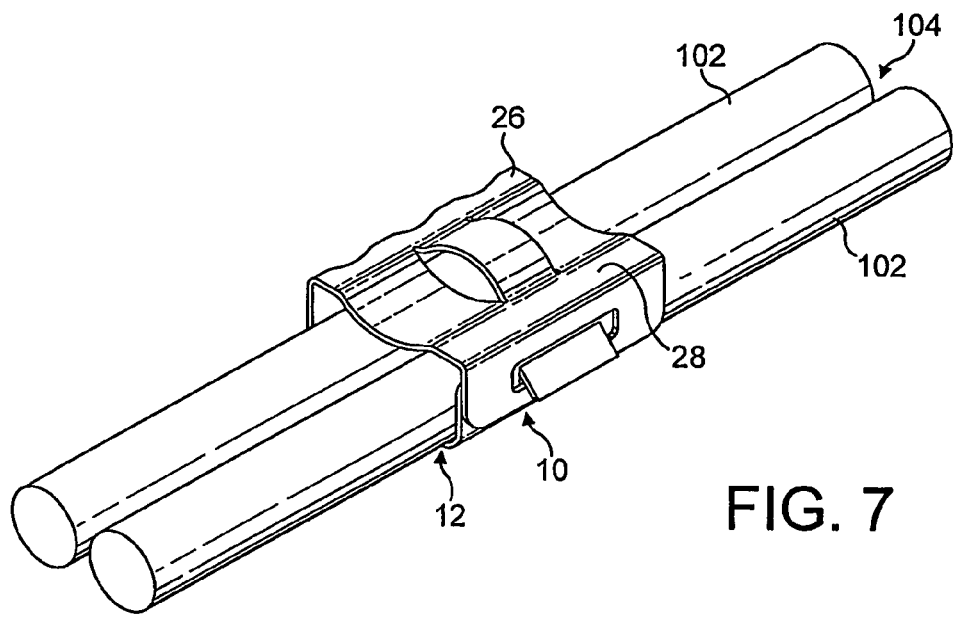
FIG. 7 shows two electrical cables secured in the electrical cable clip shown in FIG. 1.
Figure 8:
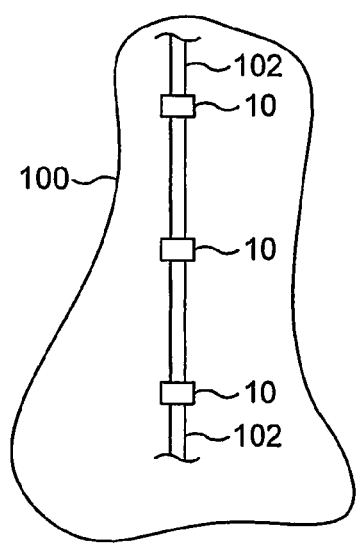
FIG. 8 shows electrical cabling installed using a series of electrical cable chips as shown in FIG. 1.

Referring to FIGS. 1 and 2, an electrical cable clip 10 for securing electrical cabling to a structure, such as the wall of a building or the like, comprises a body comprising a base portion 12 and opposed side walls 14, 16 projecting upwardly from opposite sides of the base portion to define a channel 18 for receiving two electrical cables (as shown in FIG. 7). The sidewalls 14, 16 are curved at their lower ends where they join the base portion 12, such that the channel 18 is generally U-shaped.

The electrical cable clip 10 has a closure member 20 that is integral with the sidewall 14. A hinge 22 is defined between the closure member 20 and the sidewall 14 by a series of perforations 24 provided at spaced intervals along the length of the clip where the closure member joins the sidewall 14. The perforations 24 extend further in the lengthways direction of the hinge than in the direction-transverse thereto. That is, the perforations 24 are longer than they are wide. Preferably, the perforations 24 are lozenge-shaped.

The closure member 20 comprises two flat side portions 26, 28 extending in parallel in the lengthways direction of the clip 10 and interconnected by a centre portion that comprises two concave end portions 30 and a convex portion 32 separating the convex end portions. As described in more detail below the convex portion 32 defines a loop, or strap, into which a blade, such as a screwdriver blade, can be inserted for the purpose of opening the clip.

The closure member 20 further comprises a lip 36 that extends perpendicularly from the side portion 28. As shown in FIG. 7, the lip 36 is arranged such that when the clip is closed, it lies against and is generally parallel to the external face of the sidewall 16. The lip is provided with an elongate aperture 38 extending in the lengthways direction thereof. The sidewall 16 has a locking member, or tongue, 40 projecting therefrom. The locking member 40 is connected with the sidewall 16 along its upper edge and projects obliquely therefrom in a generally downward direction. The locking member 40 is not as long as the aperture 38 so that it can readily be received in the aperture and the clip has sufficient resilience to permit the locking member 40 to snap-fit into the aperture when the closure member 20 is pressed downwardly (as indicated by the arrows 42 in FIGS. 1 and 2) to its closed position. Thus the aperture 38 and locking member 40 provide a snap-fit locking mechanism for the clip 10 whereby the closure member 20 can be locked in its closed position to securely retain electrical cables in the channel 18. The separation of the centre portion of the closure member 20 into the three portions 30, 32 provides some of the flexibility that allows the snap-fitting of the closure member.

As best seen in FIG. 2, the base portion 12 of the electrical cable clip 10 has a centrally located depression 48 that defines a projection 50 projecting from the rear side 12R of the base portion. The depression 48 has a centrally located aperture 52 that is sized to receive a screw or a nail. As explained in more detail below, in a preferred embodiment, the aperture 52 is relatively small in diameter and sized to receive a nail. The depression is sized to receive the head of the nail so that, in use, the nail head will be below the base portion, or at least does not protrude into the channel 18.

A preferred use of the electrical cable clip 10 is for fixing fire resistant cable to buildings and the like. For this use, the clip must be made of a material that is fire resistant so as to ensure that support for the cabling is provided, even when exposed to direct flames at temperatures in the region of 950C. For this purpose, the clip may be manufactured from a steel that is suitable for pressing and providing sufficient resilience to allow for bending at the hinge 22 and snap-fitting of the locking member 40 into the aperture 38. Plain mild steel is a suitable material and when the electrical cable clip is made of steel, it may be powder coated to provide corrosion resistance and colour coding for identification purposes. Of course, colour coding can be used whatever material the clip is made from.

Figure 3:
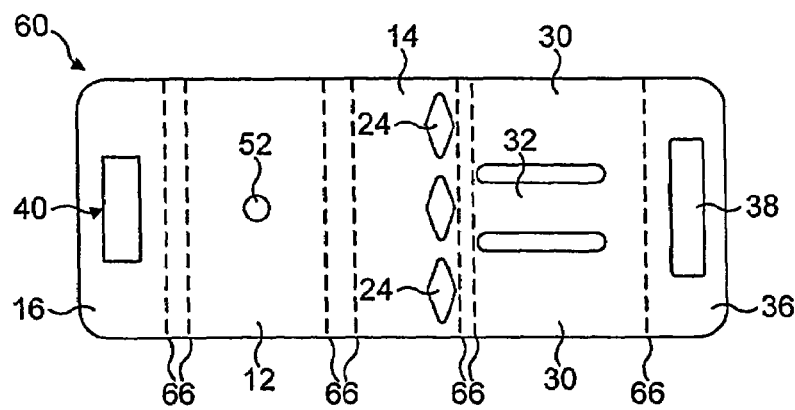
FIG. 3 shows a blank from which the electrical cable clip shown in FIGS. 1 and 2 can be formed.

FIG. 3 shows a steel blank 60 suitable for forming the electrical cable clip 10 by pressing. The blank 60 can be formed by any conventional pressing technique and is provided with the lozenge-shaped apertures 24 of the hinge 22, the aperture 38 of the snap-fit locking mechanism and the aperture 52 for the nail. The sidewall 16 is pierced to form the locking member 40, which is pressed out of the sidewall 16 leaving a correspondingly shaped aperture 62 (FIG. 1) in the sidewall. Apertures 64 are provided in the closure member 20 to permit the opposite projection of the concave portions 30 and convex portion 32. Lines along which the blank is folded during the forming process are indicated by dashed lines 66.

Figure 4:
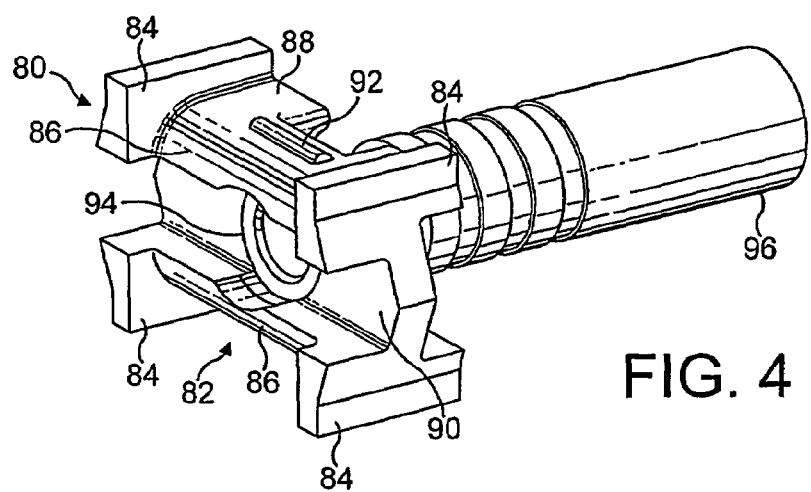
FIG. 4 is a perspective view of an adapter suitable for use in fixing an electrical cable clip, such as the clip shown in FIG. 1, to a building structure.
Figure 5:
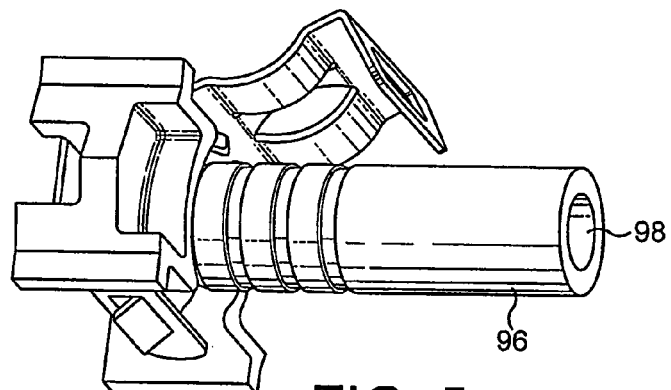
FIG. 5 is a perspective view similar to FIG. 4 showing the electrical cable clip shown in FIG. 1 fitted to the adapter.
Figure 6:
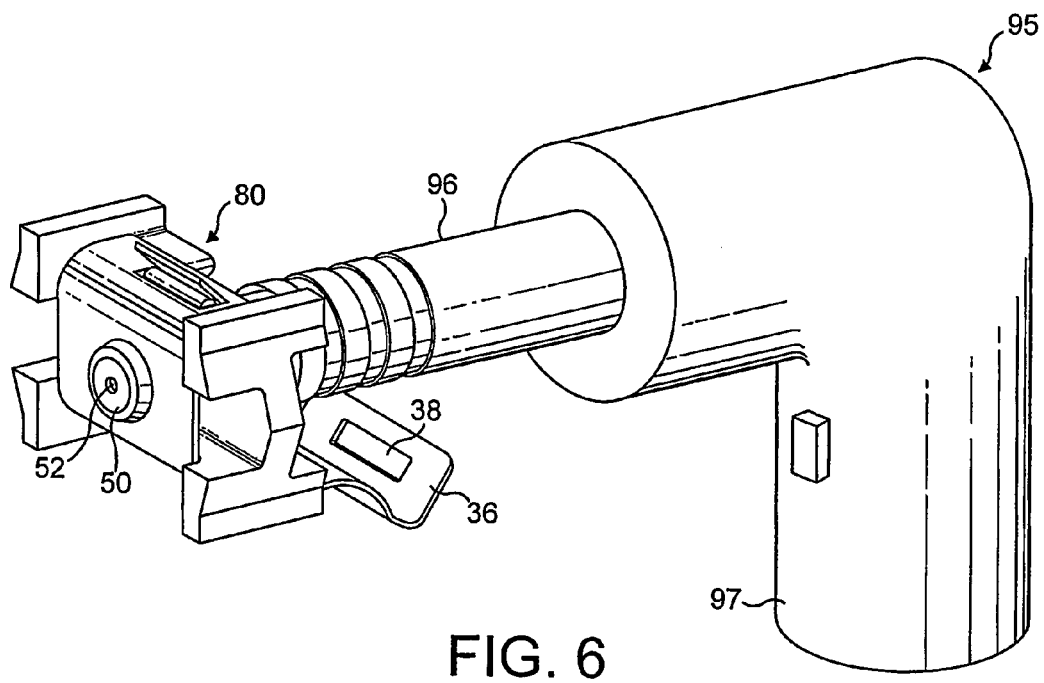
FIG. 6 is perspective view of the clip and adapter shown in FIG. 5 fitted to a schematic representation of a nail gun.

In use, it is preferred that the electrical cable clip 10 is installed using a nail gun. Any suitable nail gun may be used, but the preferred and recommended nail gun is the Spit Pulsa gun from ITW Construction Products. FIG. 4 shows an adapter 80 for use in holding an electrical cable clip, such as the clip 10, during the process of nailing the clip to a structure using a Spit Pulsa nail gun.

Referring to FIG. 4, the adapter 80 comprises a central body part 82 onto which the electrical cable clip 10 can be fitted. The body part 82 is situated between four legs 84. The body part 82 has two radiused edges 86 that lead to respective planar side faces 88. These edges 86 and side faces 88 are shaped and sized to match the profile of the channel 18 of the clip 10 so that the clip can be pushed onto the adapter and seat on the edges 84 and side faces 88. A groove 90 is provided in the leading end face of the body part 82 between the edges 86 to provide clearance between the adapter body part 82 and the base portion 12 of the clip.

One of the side faces 88 is provided with a projection 92 that is arranged to fit into the opening 62 behind the locking member 40 when the clip 10 is seated on the adapter. The spacing of the legs 84 is such that the distance between their opposed faces in the lengthways direction of the adapter corresponds to the length of the clips with a small clearance. Accordingly the clip can be reliably supported and located on the adapter body part 82.

The adapter body part 82 has a through-hole 94 extending perpendicular to its longitudinal axis and parallel to the legs 84. The through-hole 94 is adapted to receive a nozzle 96 of a nail gun. The illustrated embodiment is arranged to receive the nozzle of a Spit Pulsa nail gun, but it will be appreciated that the adapter body part may be adapted for connection to the nozzles of other nail guns by any suitable or desired means.

The through-hole 94 is positioned such that the bore 98 of the nozzle 96 is aligned with the aperture 52 of a clip 10 when it is located and supported by the adapter so that a nail fired through the bore 98 will be directed through the aperture 52.

A method of installing fire resistant electrical cabling using electrical clips 10, an adapter 80 and a nail gun 95 will now be described with reference to FIG. 4 to 8.

First, an adapter 80 is fitted to the nozzle 96 of the nail gun 95 by pushing the adapter against the nozzle so that the nozzle penetrates the through-hole 94. A clip 10 is then fitted onto the adapter 80 so that it is supported and located on the adapter, with the projection 92 received in the aperture 62 in the sidewall 16. The adapter 80 is rotatable relative to the nozzle 96 so that the orientation of the clip can be set as desired. The adapter and clip are then pressed against a firm surface, such as a wall onto which the clip is to be fixed so that the adapter is pushed fully onto the nozzle. The adapter 80 and nozzle 96 are preferably made such that as the adapter is moved into its final installed position on the nozzle, there is an audible click.

The clip 10 is then removed from the adapter 80 so that a visual check can be made to ensure that the adapter is correctly positioned on the nozzle. Once it is established that the adapter is properly located on the nozzle, the nail gun can be loaded with nails and the battery fitted. A clip 10 is then fitted onto the adapter and the nail gun is brought into position to fix the clip to the structure 100 (FIG. 8), which may be the wall of a building, with the legs 84 of the adapter pressed against the surface of the structure. In this position, the projection 52 of the clip 10 will be proximate the surface (that is touching or close to) with the aperture 52 in line with the nozzle bore 98. The nail gun is then fired causing a nail to shoot at high velocity through the aperture 52 into the structure, thereby firmly fixing the clip in position. With the nail fully inserted in the structure, the nail head is received in the depression 14 below the surface of the channel 18 so that it will not interfere with cabling inserted into the clip. The installer will usually install a series of clips 10 in this way, thereby marking out the required cable run.

Having installed the clips 10, two fire resistant cables 102 are laid side-by-side in the cable-receiving channel 18 of the first clip of the series such that they run generally parallel with one another and the sidewall 14, 16 of the clips. The closure member 20 is then pressed downwardly (as indicated by the arrows 42 in FIGS. 1 and 2) to bring the lip 36 alongside the sidewall 16. The resilience of the closure member 20 and locking member 40 are such that the lip is able to move past the locking member (primarily by deflecting the tongue) until the lip and sidewall are essentially side-by-side and the locking member 40 and aperture 38 are aligned such that the locking member can spring back through the aperture to assume the position shown in FIG. 7. In this position, the closure member 20 closes the opening to the channel 18 and it is locked in this closed position by the engagement of the locking member in the aperture. The cables 102 are thus firmly secured to the structure 100 by the electrical cable clip 10. In the same way, the cables 102 are successively installed in the remaining clips of the series to form a cable run.

When the closure member 20 is in its locked position as shown in FIG. 7, the flat side portions 26 and 28 lie substantially parallel to the base portion 12 and the concave centre portions 30 sit down in the gap 104 between the cables thus assisting in orienting the cables and limiting movement of the cables, particularly in the event they are not sufficiently large to occupy the full width of the channel 18.

The convex portion 32 of the closure member 20 provides a convenient loop into which a screwdriver blade, or other suitable object, can be inserted to lever the closure member open, in the event that the cables are to be released. This may be desirable if one or other is damaged and needs to be replaced. It will be understood that to improve the releasability of the clip, the locking member 40 might be reconfigured so that it has two similar lead-in profiles that provide an increasing resistance to movement of the lip 36; one being operative when the closure member is being opened and the other when the closure member is being closed.

It will be appreciated that securing the electrical cable clips 10 to the structure 100 by means of a nail fired from a nail gun is considerably faster than drilling and plugging a hole and then screwing a screw into the plugged hole. Furthermore, because the electrical cable clip is secured to the structure before the cables 102 are fitted into the clip, the installer has both hands free to concentrate on inserting pulling the cables straight prior to pressing the closure member 20 into its closed position. It is therefore quicker and easier for the installer to install electrical cabling using the electrical cable clip 10 with a nail gun.

Trials carried out using the electrical clip 10 and a Spit Pulsa nail gun with nails supplied by ITW Construction Products have shown a significant increase in installation speed as compared with conventional methods. Installation may be as much as five times faster. Thus for a 100 m installation with the clips spaced at 300 mm intervals, it has been possible to reduce the installation time from approximately 24 to 4 to 5 hours. It will be understood that with labour charges representing a significant part of the overall installation, reducing the time taken by this amount provides the potential for considerable cost savings.

It will be appreciated that although it is preferred that the electrical cable clips are installed ahead of the cable(s), if desired, the installer could choose to nail a clip to the structure and secure the cable(s) into that clip, before moving on to install the next clip. This will still provide considerable time savings as compared with conventional methods, but will generally not be as efficient as installing all of the clips of the cable run first, or at least all of the clips of a sub-section of a run.

It will be appreciated that although the electrical cable clip 10 is shown as being sized to receive two electrical cables side-by-side, it could instead be designed to receive only one cable or, three or more cables.

Although not essential, it has been found that reducing the area of contact between the electrical cable clip and the structure to which it is fixed improves the security of the fixing. It is believed this is because it ensures that the force delivered by the nail gun to the nail is not dissipated. Thus it is desirable that the clip is formed with a relatively small projecting area, which makes the initial contact with the structure when the nail is fired through the aperture 52. If the structure is relatively hard, the projection provides the only point of contact with the structure, leaving the remainder of clip supported off the structure by the projecting area. However, if the material is relatively soft (for example, with some loose concrete type surfaces a degree of crumbling will often occur around the top of the nail hole), the projection pushes into the structure to the extent the contact area may include the rear surface 12R of the clip. The projection pushing into the loose surface increases the area of contact around the nail in loose surfaces improving the securing of fixing for such surfaces. In the embodiment, there is only one projecting area. However, particularly with a larger clip, it may be desirable to use two nails, in which case, two projections would be provided, one for each nail.

It is preferred that the closure member 20 is an integral part of the electrical cable clip. However, it will be appreciated that it could be a separate part that would be snap-fitted or otherwise secured on the clip body so as to secure the cable(s) within the channel 18. Having an integral clip hinged to the clip body so that it can simply be pressed into its closed position provides for a speedy closure operation and avoids the problem of providing multiple parts and the time wasted in finding and attaching closure members to the clip bodies.

While it is preferred that the closure member is provided with the two concave portions 30 and the convex portion 32, this is not essential. The entire centre region of the closure member could be concave in the manner of the concave portions 30, or the portion closing the opening of the channel 18 might be substantially planar. In either case, the closure member would preferably be pierced to reduce its stiffness and thereby make snap-fitting easier.

It will be understood that using an adapter that can reliably orient and support the electrical cable clip while it is being installed provides several advantages. Firstly, the installer does not have to provide any support for the clip and does not therefore need to put his/her hands near the clip during the nailing process. This considerably reduces the likelihood of there being an accident involving the installer's hands. Furthermore, by correctly fitting the adapter on the nozzle, the installer can have the adapter oriented relative to the nail gun such that the clips can easily be installed in the required orientation on the wall while the nail gun is held in the most convenient orientation for the nailer. The installer has only to change the orientation of the adapter so that the axis of the groove 90 runs in the desired direction of the cable run to be able to present the cable clip to the structure in the correct orientation without having to alter the angle of presentation of the nail gun to the structure. Thus, if the nail gun has a 'natural vertical orientation', in which the nail gun handle 97 extends generally vertically, there is no need to change this in order to fit clips to the wall for vertical and horizontal runs. All that the installer need do is rotate the adapter 90° about the axis of the nozzle, or depending on the design of the nozzle and adapter, rotate the nozzle through the same angle. Thus, with the adapter 80 in the position shown in FIG. 6, with the nail gun held in its normal upright use condition with the handle 97 extending generally vertically, the electrical cable clip 10 is located and supported such that the cable-receiving channel 18 extends generally horizontally for a generally horizontal cable run. For a vertical cable run, the adapter can be rotated through 90° so that the groove 90, and therefore the cable-receiving channel 18 extend generally vertically in parallel with the handle 97. Accordingly regardless of the desired installation of the electrical cable clip, the installation can always be made with the nail gun in its normal upright condition.

It will be understood that although the adapter 80 is shown as being connected to the nozzle of a nail gun by push-fitting the nozzle into a bore in the adapter body, any convenient form of connection may be used. Furthermore, the nozzle and adapter may be made as one item.

It will be appreciated that although the electrical cable clip is shown as being fitted to the adapter with the adapter body received in the cable-receiving channel 18, this is not essential. All that is required is that the clip is reliably oriented and held by the adapter so that the installer can concentrate locating the clip at the desired location on the structure and operating the nail gun.

It will be appreciated that although it is preferred that the electrical cable clip is installed using a nail gun, it may be installed using a powered screwdriver. The fixing element would then preferably be a self-tapping screw capable of cutting into masonry or the like.

In the description, reference has been made to installing cable to a structure. The structure will often be a part of a building and in many cases will be some form of masonry structure. However, the invention is in no way limited to installing cables on masonry structures and can be applied to the installation of cables to any rigid structure on which cabling might be installed. In the case of embodiments in which the cabling is installed using a nail gun, it will be understood that the structure must be capable of receiving a nail.

In the description, reference has been made to upwards and downwards directions. It is to be understood that this is purely for ease of description with reference to the drawings and is no way to be taken as limiting.

The invention claimed is:

1. A method of installing electrical cabling, said method comprising securing an electrical cable clip to a structure using a fixing element that passes through said clip into said structure, said fixing element being a nail, subsequently inserting at least one electrical cable into a cable receiving channel in said clip and securing said at least one electrical cable in said channel, wherein the step of securing comprises operating an integral closure member of said clip to close an opening through which said at least one electrical cable is inserted into the channel, characterized in that the method further comprises the steps of:

associating the clip to a nail gun by attaching a first aperture possessed by the clip to a projection on the nail gun;

firing said nail into said structure by the nail gun through a second aperture in the clip; and engaging said integral closure member to a first projection of the clip, said first projection defining said first aperture.

2. The method as claimed in claim 1, wherein said closure member is secured in a position closing said opening by operation of a snap-fit locking mechanism.

3. The method as claimed in claim 1, wherein said step of securing said electrical cable clip to said structure comprises locating and supporting said clip on a nozzle of the nail gun during said step of firing said nail into said structure.

4. The method as claimed in claim 3, wherein said nail gun has an upright normal use position and said step of locating said electrical cable clip on the nozzle of the nail gun comprises orienting said electrical cable clip such that with said nail gun in said upright normal use position, the cable receiving channel of the electrical cable clip is aligned with a desired direction of lie of said at least one electrical cable.

5. The method as claimed in claim 3, comprising locating said electrical cable clip on an adapter body that is fitted onto said nozzle.

6. The method as claimed in claim 3, comprising locating said electrical cable clip on an adapter body that is fitted onto said nozzle, wherein said nozzle has a longitudinal axis and said step of orienting said electrical cable clip comprises rotating said adapter body about said longitudinal axis.

7. The method as claimed in claim 6, comprising rotating said adapter body to provide a desired orientation of said electrical cable clip prior to locating said clip on said adapter body.

8. The method as claimed in claim 1, wherein said electrical cable clip has a second projection provided with the second aperture wherein said clip is secured to said structure such that first contact between the clip and the structure is via said second projection.

9. The method as claimed claim 1, wherein said fixing element passes through a bottom region of said cable receiving channel.

10. The method as claimed in claim 1, wherein said at least one electrical cable is a fire resistant electrical cable.

11. The method as claimed in claim 1, wherein said step of inserting at least one electrical cable comprises inserting two electrical cables such that they are disposed in a generally side-by-side relationship and wherein said electrical cable clip is secured by a single fixing element.

12. The method as claimed in claim 1, comprising securing a plurality of said electrical cable clips to said structure to define a cable run and subsequently inserting said at least one electrical cable into the respective cable receiving channels of said clips.

13. A method of installing electrical cabling, comprising the steps of:

associating an electrical cable clip body to a nail gun by attaching a first aperture possessed by the clip to a projection on the nail gun;

firing a nail from the nail gun through a second aperture in a base region of said cable receiving channel such that the nail fixes the electrical cable clip to said structure and a head of the nail does not protrude into said channel;

inserting at least one electrical cable through an opening into said cable receiving channel such that the cable lies against said base region; and pressing a closure member over said opening of said cable receiving channel and snap-fitting said closure member into locking engagement with a projection of said electrical cable clip body. the projection of the cable clip defining the first aperture, such that said at least one electrical cable is secured in said cable receiving channel.

14. A method of installing electrical cabling, comprising the steps of:

locating an electrical cable clip on a nozzle of a nail gun by attaching a first aperture possessed by the clip to a projection on the nail gun, such that an elongate cable-receiving channel of said clip has a desired orientation relative to a normal upright use position of said nail gun;

placing said electrical cable clip proximate a structure to which it is to be fixed with said nail gun in said upright use position and firing a nail from said nail gun through a second aperture in a base region of said electrical cable clip into said structure;

inserting at least one electrical cable through an opening into said cable receiving channel; and closing said opening to secure said at least one electrical cable in said cable receiving channel by snap-fitting a closure member to a projection of the clip in a position in which it closes said opening, the projection of the clip defining the first aperture.

15. A method as claimed in claim 14, wherein said electrical cable clip is located on a body connected with said nozzle and said body is movable relative to said nozzle to permit orientation of said electrical cable clip.

* * * * *